(12) United States Patent
Howland et al.

(10) Patent No.: US 9,890,988 B2
(45) Date of Patent: Feb. 13, 2018

(54) HIGH TEMPERATURE RESISTANT SHIPPING CONTAINER

(71) Applicant: Warwick Mills Inc., New Ipswich, NH (US)

(72) Inventors: Charles A Howland, Temple, NH (US); Jeremy Branson, Lorton, VA (US); Isaac Angres, North Potomac, MD (US)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 15/353,012

(22) Filed: Nov. 16, 2016

(65) Prior Publication Data

US 2017/0314835 A1    Nov. 2, 2017

Related U.S. Application Data

(60) Provisional application No. 62/328,211, filed on Apr. 27, 2016.

(51) Int. Cl.
*F25D 3/08* (2006.01)
*B65D 81/38* (2006.01)
(Continued)

(52) U.S. Cl.
CPC ........... *F25D 3/08* (2013.01); *B65D 81/3816* (2013.01); *B65D 81/3823* (2013.01); *F25D 23/068* (2013.01); *H01M 2/1094* (2013.01); *F25D 2201/124* (2013.01); *F25D 2201/126* (2013.01); *F25D 2201/1262* (2013.01); *F25D 2303/083* (2013.01)

(58) Field of Classification Search
CPC ............... F25D 3/08; F25D 2201/126; F25D 2201/124; F25D 2303/083; F25D 2201/1262; B65D 81/3823; B65D 81/3816

See application file for complete search history.

(56) References Cited

U.S. PATENT DOCUMENTS 6,166,391 A * 12/2000 Strine .................... G21C 19/40
                                                              250/506.1
6,765,031 B2 * 7/2004 Salyer .................... C08J 9/0009
                                                              521/142

(Continued)

FOREIGN PATENT DOCUMENTS

WO    2014088742 A1    6/2014
WO    2016012768 A1    1/2016

OTHER PUBLICATIONS

International Search Report and Written Opinion of Application No. PCT/US2017/016211, dated May 8, 2017, 20 pages.

*Primary Examiner* — Len Tran
*Assistant Examiner* — Ana Vazquez
(74) *Attorney, Agent, or Firm* — Maine Cernota & Rardin

(57) ABSTRACT

A robust, durable, easy to use, reusable shipping container is disclosed that is capable of protecting contents from surrounding high temperatures up to 1000 degrees Fahrenheit for a minimum of at least three and a half hours. The container includes an inner chamber surrounded by an outer chamber. A phase change liquid (PCL) is sequestered in a porous support matrix contained in the inner chamber, while the outer chamber is filled with high temperature insulation, forming an outer barrier layer that is designed to reduce heat flux into the inner chamber.

23 Claims, 1 Drawing Sheet

(51) Int. Cl.
*F25D 23/06* (2006.01)
*H01M 2/10* (2006.01)

(56) References Cited

U.S. PATENT DOCUMENTS

| | | |
|---|---|---|
| 2002/0017590 A1 | 2/2002 | Fay et al. |
| 2006/0188672 A1 | 8/2006 | Brower |
| 2007/0289894 A1* | 12/2007 | Tennant ............. A61B 10/0096 206/569 |
| 2010/0276300 A1* | 11/2010 | Teymour ................ B01D 15/00 205/637 |
| 2011/0083826 A1* | 4/2011 | Matta ...................... B29C 44/14 165/104.13 |
| 2012/0067762 A1 | 3/2012 | Cavenagh et al. |
| 2013/0255306 A1* | 10/2013 | Mayer ...................... F25D 3/08 62/457.2 |

* cited by examiner

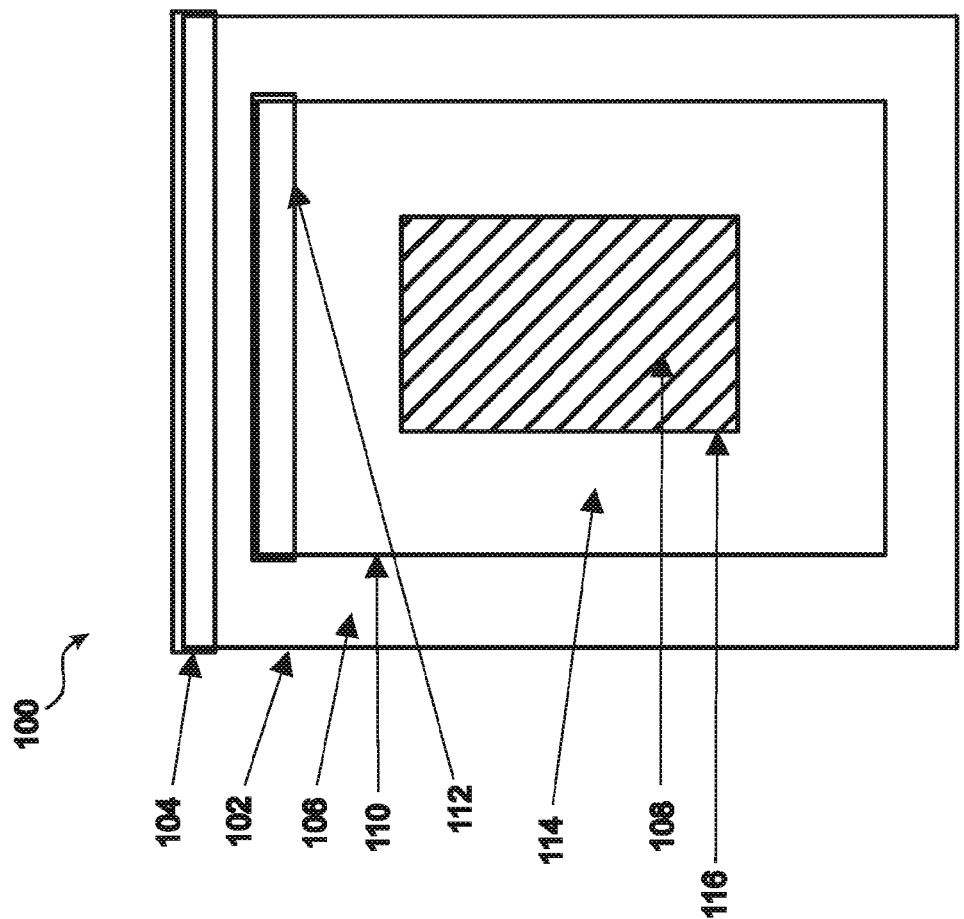

HIGH TEMPERATURE RESISTANT SHIPPING CONTAINER

RELATED APPLICATIONS

This application claims the benefit of U.S. Provisional Application No. 62/328,211, filed Apr. 27, 2016, which is herein incorporated by reference in its entirety for all purposes.

STATEMENT OF GOVERNMENT INTEREST

The invention was made with United States Government support. The United States Government has certain rights in this invention.

FIELD OF THE INVENTION

The invention relates to shipping and packaging containers, and more particularly, to containers for shipping temperature sensitive contents under conditions where exposure to high temperature is an anticipated possibility.

BACKGROUND OF THE INVENTION

A wide variety of different types of container exist for the packing and shipping of goods. These range from paper envelopes and wooden crates to custom plastic and metal enclosures. However, very few of these containers can protect contents from extreme temperatures greater than 1000° F. over meaningful time durations such as three hours or more.

Many situations can arise where protection of contents from extreme heat is needed. A fire in a cargo hold generates ample temperatures to require this type of protection. One example of growing importance is the shipment of lithium batteries and lithium-ion batteries (herein referred to generically as "lithium batteries"). Lithium batteries can be dangerous under some conditions and can pose a safety hazard because they contain a flammable electrolyte and also because they are kept pressurized. Moreover lithium batteries contain oxidizers, which can makes fire suppression very difficult.

Accident investigators recently traced a fire that destroyed a UPS Boeing 747 in the United Arab Emirates city of Dubai in 2010 to lithium batteries being carried in the cargo hold. Investigators emphasized that the crash highlighted the risks posed by shipment of lithium batteries, which are prone to overheating, leading to intense fires. Unless something is done to prevent similar disasters, the FAA now says such crashes are all but inevitable in the future.

In the wake of the Dubai 747 crash, UPS has started using fireproof cargo containers, and has ordered more than 1,800 fiber-reinforced shipping containers that are designed to withstand fires for up to four hours. However, while such containers may maintain their integrity in a fire, they do little to prevent a surrounding fire from heating lithium batteries contained therein and eventually causing them to explode.

It is estimated that over a billion lithium cells are flown each year. In a recent report issued by the Federal Aviation Administration in conjunction with Transport Canada, the agencies predicted there will be an average of six cargo plane crashes between now and 2021, with four of them likely to be caused by lithium battery fires.

The US Department of Transportation ("DOT") has specified that dangerous materials when shipped must not become accelerants or contribute to a fire in airplane cargo holds. The US DOT criteria require that there be no contribution to the fire from shipped materials for 3.5 hours when exposed to a temperature of 1000 F.

Some postal administrations currently restrict air shipping (including Emergency Medical Systems) of lithium and lithium-ion batteries, either separately or installed in equipment. Lithium-ion batteries containing more than 25 grams (0.88 oz) equivalent lithium content ("ELC") are forbidden in US air travel. Similar restrictions apply in Hong Kong, Australia and Japan.

One approach to reducing the risk of lithium battery explosions during a fire is to enclose the batteries in so-called "phase-change" packaging, which is packaging that surrounds contents with an unbroken barrier comprising an substance such as water that vaporizes when subjected to heat, thereby maintaining the contents at the boiling temperature of the vaporizing substance until the vaporizing substance is exhausted. Unfortunately, however, many phase change packaging approaches that work well at less extreme temperatures fail when subjected to temperatures greater than 1000° F. This is because internal structural degradation caused by the very high temperatures tends to open up gaps or "windows" in the phase change shield that allow the external heat to penetrate and reach the inner contents. Even if the phase change substance is contained in compartments or "packs" of a gel or similar substance, and the packs are held in place by rigid walls that maintain their structure at high temperatures, the packs themselves can nevertheless shrink and sag as the water or other phase-changing substance is consumed, thereby opening up gaps or "windows" in the phase-change shield.

Some of these limitations can be avoided by filling a packing container with a mixture of vermiculite and water as a single-use packing material that completely surrounds and submerges the lithium batteries or other contents. When heated, the water in the vermiculite is vaporized, but the vermiculite continues to surround and cover the contents, allowing the vaporized water to flow throughout and permeate the vermiculite, so that "windows" are avoided and the contents remain protected until the water is fully exhausted. However, while somewhat effective, such packaging requires added insulation, is not easy to use, is not reusable, and is not sufficiently robust or durable for certain applications.

What is needed, therefore, is a robust, durable, easy to use, reusable container capable of protecting contents from surrounding high temperatures up to 1000 degrees Fahrenheit for a minimum of at least three and a half hours.

SUMMARY OF THE INVENTION

A robust, durable, easy to use, reusable container is disclosed that is capable of protecting contents from surrounding high temperatures up to 1000 degrees Fahrenheit for a minimum of at least three and a half hours. The container includes an inner chamber surrounded by an outer shell. A phase change liquid ("PCL") material is sequestered in a matrix contained in the inner chamber, while the space between the inner chamber and the outer shell walls is filled with high temperature insulation, forming an outer barrier layer that reduces the heat flux into the inner chamber.

According to the disclosed invention, the heat that flows into the inner chamber heats both the matrix and the PCL. The PCL flashes to gas and maintains the temperature within the inner chamber at the vaporization temperature of the PCL. The container includes features that allow the flashed PCL to escape when exposed to heat or fire, while preventing the PCL from evaporating during normal storage.

As noted above, The US DOT has specified that dangerous materials when shipped must not become accelerants or contribute to a fire in airplane cargo holds for up to 3.5 hours when exposed to a temperature of 1000° F. Embodiments of the present invention satisfy this DOT requirement with a design factor of 2 by providing approximately 10,000 kJ of phase change heat capacity, in combination with surrounding insulation that limits heat flux so that the PCL is not exhausted within 3.5 hours of exposure at 1000° F., and in embodiments up to 7 hours of exposure at 1000° F. Some of these embodiments that use water as the PCL consume approximately 10 gallons of water per minute when exposed to an exterior temperature of 1000° F., such that the inner chamber is maintained in a steam atmosphere at a temperature of approximately 212° F. Various of these embodiments require 4.5 kg of water to meet the US DOT criteria.

One general aspect of the present invention is a high temperature resistant shipping container that includes an outer chamber surrounded by container walls, an inner chamber located within the outer chamber and surrounded by inner chamber walls that divide the inner chamber from the outer chamber, an outer insulation layer contained within the outer chamber, a support matrix contained within the inner chamber, a phase change liquid ("PCL") saturating and supported by the support matrix within the inner chamber, and a payload area located within the inner chamber and surrounded by the PCL-saturated support matrix.

In embodiments, the outer container walls comprise at least one of steel, cementitious board, fiberglass cloth combined with corrugated cardboard, and ceramic fiber cloth combined with corrugated cardboard.

In any of the preceding embodiments, the outer insulation layer can include at least one of vermiculite, a cellulosic fiber pulp combined with at least one of a boric acid stabilizer, a fire retardant, cellulose foam sponge material, and a foamed polymeric material.

In any of the preceding embodiments, the support matrix can include at least one of vermiculite, para aramid fiber pulp, meta aramid fiber pulp, polyvinyl alcohol foam sponge material, high expansion polyester foam sponge material, and open cell polyurethane foam sponge material.

In any of the preceding embodiments, the container can be configured to inhibit evaporation of the PCL at atmospheric pressure, while allowing vaporized PCL to escape from the container at pressures above atmospheric pressure.

In any of the preceding embodiments, the PCL can have a total weight of less than 4.5 kg.

In any of the preceding embodiments, the outer insulation layer can occupy a volume that is between 30% and 70% of a volume of the outer chamber.

In any of the preceding embodiments, the inner chamber can occupy a volume that is between 30% and 70% of a volume of the outer chamber.

A second general aspect of the present invention is a high temperature resistant shipping container that includes in inner chamber containing a support matrix that supports and is saturated by a phase change liquid ("PCL") that includes at least one of water and ethylene glycol.

In embodiments, the support matrix includes at least one of expanded vermiculite, cellulosic pulp and fiber combined with at least one of boric acid stabilizer and a fire retardant, a foamed polymeric material, para aramid fiber pulp, and meta aramid fiber pulp.

In any of the preceding embodiments, the support matrix can include at least one of polyvinyl alcohol foam sponge material, high expansion polyester foam sponge material, open cell polyurethane foam sponge material, and cellulose foam sponge material.

In any of the preceding embodiments, the PCL can be water having a total mass that is at least 600% of a mass of the support matrix.

In any of the preceding embodiments, a super absorbing polymer ("SAP") is blended with the support matrix. In some of these embodiments, a mass of the SAP is between 0.5% and 50% of a mass of the support matrix. And in some of these embodiments the SAP can be able to stabilize a quantity of water having a mass that is more than 100 times as large as a mass of the SAP.

A third general aspect of the present invention is a high temperature resistant shipping container containing a phase change liquid ("PCL") having a sufficient volume to maintain an inner payload at a temperature below 300° F. during an exposure of the container to a temperature of 1000° F., said exposure lasting more than 3.5 hours. In embodiments, the PCL is water.

In any of the preceding embodiments, the PCL can be supported by a porous matrix. And in some of these embodiments, the support matrix is expanded vermiculite.

In any of the preceding embodiments, the PCL can be surrounded by a high temperature insulation layer.

In any of the preceding embodiments, the container can include an outer steel drum having a containment volume of 10 gallons and an inner steel drum having a containment volume of 5 gallons. Or the container can include an outer steel drum having a containment volume of 30 gallons and an inner steel drum having a containment volume of 10 gallons. Or the container can include an outer steel drum having a containment volume of 55 gallons and an inner steel drum having a containment volume of 20 gallons.

And in any of the preceding embodiments, the PCL can have a total mass of greater than 2.5 kg.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWING

FIG. 1 is a cross-sectional diagram of an embodiment of the present invention.

DETAILED DESCRIPTION

A robust, durable, easy to use, reusable container is disclosed that is capable of protecting contents from surrounding high temperatures up to 1000 degrees Fahrenheit for a minimum of at least three and a half hours. The container includes an inner chamber surrounded by an outer shell. A phase change liquid ("PCL") material sequestered in a matrix is contained in the inner chamber, while the space between the inner chamber and the outer shell walls is filled with high temperature insulation, forming an outer barrier layer that is designed to reduce heat flux into the inner chamber.

FIG. 1 presents a cross-sectional diagram of an embodiment 100 of the present invention, in which the various structural elements are indicated. These structural elements are described in what follows.

Outer Shell

The outer shell is capable of maintaining containment of the system even after extended exposure to high temperatures up to 1000° F. In FIG. 1, the outer shell includes outer walls 102 and an outer closure 104. Materials used in various embodiments include:

- Steel
- Cementitious board
- Fiberglass cloth (in combination with corrugated cardboard)
- Ceramic fiber cloth (in combination with corrugated cardboard)

All these materials provide low mass/cost and retained tensile and bending at 1000° F.

In a first family of outer shell embodiments, the walls 102 and closure 104 of the outer shell are rigid and structural. These embodiments have advantages of improved resistance to shock and vibration, and some of these rigid solutions have more than enough crush resistance for palletized stacking loads.

In a second family of outer shell embodiments, the walls 102 and closure 104 of the outer shell are soft. In some of these embodiments, the soft outer walls 102 and closure 104 are used in combination with corrugated paper packaging to provide a certain amount of crush resistance for the high temperature insulation layer. Note that the use of a limited amount of flammable dunnage is acceptable to the DOT.

Insulating Layer

As noted above, the invention provides for management of the heat flux into the inner chamber by providing a plurality of system layers. Just inside of the outer shell 102, 104 structural layer, a low density insulating layer 106 is provided that moderates the heat flux into the PCL containing inner chamber volume 108. When exposed to heat, the outer face of this insulating layer 106 will be exposed to very high temperatures. Accordingly, so as to avoid any combustion this layer 106 must be inert at 1000° F. This high temperature requirement limits the material family for the insulating layer 106 to inorganic materials. Embodiments include one or more of:

- Expanded vermiculite
- Fiberglass batts
- Ceramic fiber batts
- Rock Wool
- Inorganic foam
- Glass foams
- Aerogels In various embodiments, the outer insulation layer 106 represents from 30-70% of the total volume of the system. Embodiments that include higher performance materials in the insulation layer are able to moderate the heat flux while occupying a lower percentage of the system volume.

Inner Chamber Walls

The inner chamber 114 in the system contains the PCL, which must be prevented from flowing or wicking into the outer, high temperature insulating layer 106. Therefore, the separator walls 110 and closure 112 between the inner 114 and outer 106 chamber (which is referred to herein as the inner chamber walls 110, 112) must provide a barrier to movement and evaporation of the PCL. Furthermore, when exposed to heat flow, the flashing of the PCL into gas must be managed by the inner chamber walls 110, 112. In embodiments, the vaporized PCL is wicked away from the inner chamber 114 by the surrounding wall 110, 112.

Accordingly, the inner chamber walls 110, 112 must provide resistance to leakage of liquid PCL and resistance to PCL vapor at its boiling point, while retaining its tensile properties even when the external temperature is maintained at 1000° F. for up to 3.5 hours. In embodiments, the inner chamber 114 is also separable from the outer chamber 106 and vapor competent.

In a first family of inner chamber embodiments, the inner chamber walls 110, 112 are fabricated from rigid steel, aluminum, and/or fiber reinforced polymer. This family of embodiments provides for enhanced mechanical integrity of the payload, and can sustain more shock and vibration that some other embodiments. Some of these embodiments include close fitting caps or lids 112 with mechanical fasteners (not shown) that provide excellent separable closure options.

In a second family of inner chamber embodiments, the inner chamber walls 110, 112 are fabricated from flexible materials, such as metallic foils and/or reinforced and/or unreinforced polymer films. Bonded and heat-sealed closures and rolled and clamped closures are also part of this family of embodiments. Materials used in the fabrication of the inner chamber walls 110, 112 in various embodiments include:

- Steel
- Aluminum
- Metallic foil
- Fiber reinforced polyester film
- Fiberglass with polymer matrix

Phase Change Liquid (PCL)

Various phase change liquids ("PCL's") are used in embodiments of the invention, including water and/or ethylene glycol. It is advantageous that the heat of vaporization of the PCL be as high as possible. Water has a very large advantage over other materials in this regard, due to its remarkably high heat of vaporization. Also, because PCL vapor escapes from the containment during heat exposure, the PCL vapor must not be flammable. A number of inert organic materials that would meet the heat of vaporization requirement for a PCL do not meet this vapor combustion requirement. Water and steam do not contribute to combustion, and have a high heat of vaporization.

Inner Chamber PCL Matrix

Expanded or exfoliated vermiculite is used in some embodiments of the invention as the matrix that contains the PCL in the inner chamber 114, because if its low density of 4-10 lb/ft3 and its fine cell structure. This material also has good water holding and stabilization properties, and because of its good insulation properties the heat flux is well controlled.

In other embodiments the PCL matrix material is cellulose pulp combined with a boric acid stabilizer and/or fire retardants. The moisture transport for this material is very good, and the density and insulation is acceptable. A primary requirement for these embodiments is that there is adequate over-pack 116 to make sure that the normal settling of cellulosic pulp does not leave a void at the top of the inner chamber volume 108. Closely related embodiments use para or meta aramid pulp. In these embodiments, no added fire retardant or stabilizer is required. Like cellulosic pulp, aramid pulp also must be over-packed so as to compensate for settling.

In various embodiments, the ratio of inner chamber volume to system volume ranges from 30% up to 70%, and the ratio of PCL mass to support matrix mass ranges from 50% to 600%. Generally, lower density matrix materials support higher PCL mass.

In embodiments, the PCL material is augmented with one or more super absorbing polymers ("SAP's"). In some of these embodiments, the SAP material is dispersed in the PCL matrix and helps to stabilize the PCL. The SAP improves the evenness of the distribution of the PCL in the inner chamber volume. Sodium polyacrylate SAP is used in some embodiments together with water as the PCL. The advantage of this system is that the sodium polyacrylate can hold 250 times its dry mass in water. This reduces the mass of the PCL matrix material that is required to hold the water in place. The total mass of SAP in some of these sodium polyacrylate embodiments is less than 100 grams distributed throughout the inner volume.

In various embodiments, the PCL matrix and stabilizing materials include at least one of:
Expanded vermiculite
Cellulosic pulp and fiber with boric acid stabilizer/fire retardants
Cellulose foam sponge chopped/reticulated/crumb and other related foamed polymeric materials
Para and meta aramid pulp and fiber
Polyvinyl alcohol foam sponge chopped/reticulated/crumb other related foamed polymeric materials
High expansion polyester foam sponge chopped/reticulated/crumb other related foamed polymeric materials
Open cell polyurethane foam sponge chopped/reticulated/crumb other related foamed polymeric materials
Stabilizing Materials
Super Absorbing Polymers, sodium polyacrylate and related materials Payload Over-Packaging Because the PCL is distributed throughout the inner chamber 114 the payload must be contained within an overpack 116 so that the payload is not exposed directly to the PCL. In addition to avoiding direct contact with the PCL, the payload must also not be placed too close to the walls 110, 112 of the inner chamber 114, since the moderation in payload temperatures that is achieved by the PCL vaporization is most effective in the center of the inner chamber. "Hot spots" can occur in the outer 1-3 inches of the inner chamber where the PCL can become exhausted locally as the heat exposure time is extended because the wicking flow of vaporized PCL away from the inner chamber 114 does not always maintain a completely even PCL distribution within the inner chamber 114.

The payload is kept away from these potential boundary layer hotspots by providing a payload buffer, or over-pack 116, which keeps the payload 118 away from the potentially hotter, outer boundary zone within the inner chamber 114. In various embodiments, the over-pack 116 is fabricated using one or more of:
Film-bagged or resonated corrugated cardboard with urethane foam filling maintaining a 1-3 inch buffer offset between the walls 110, 112 of the inner chamber 114 and the payload 118.
Metallic drums with foam or vermiculite filling that maintain a 1-3 inch buffer offset between the walls 110, 112 of the inner chamber 114 and the payload 118
Film bags with rigid foam filling that maintain a 1-3 inch buffer offset between the walls 110, 112 of the inner chamber 114 and the payload 118
Other low density dunnage or packaging materials that provide a buffer offset between the walls 110, 112 of the inner chamber 114 and the payload 118'

In other embodiments, if the PCL matrix support has sufficient stability and crush resistance, and does not flow, the PCL itself can be used to keep the payload 118 separated from the walls 110, 112 of the interior chamber 114. For example, PCL matrix materials such as vermiculite can provide this level of stability, thereby avoiding a need for the over-pack 116 to maintain this physical separation. In these embodiments, the payload packaging (i.e. over-pack 116) need only isolate the payload 118 from the PCL. In some of these embodiments, the over-pack 118 is fabricated from materials that include one or more of:
Polyethylene films with or without polyurethane ("PU") or another foam over-pack
Polypropylene films with or without PU or another foam over-pack
Coated corrugated paper board with or without PU or another foam over-pack
Metal foil with or without PU or another foam over-pack Payload Volume The goal of this invention, as for all packaging systems, is to provide a maximum payload with a minimum of shipping material volume. In embodiments, of this invention the ratio of the payload volume to the total system volume is between 10% and 20%.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

We claim:

1. A high temperature resistant shipping container comprising:
an outer chamber surrounded by container walls;
an inner chamber located within the outer chamber and surrounded by inner chamber walls that divide the inner chamber from the outer chamber, a ratio of a volume of said inner chamber to a volume of said container being between 30% and 70%;
an outer insulation layer contained within the outer chamber;
a support matrix contained within the inner chamber; and
a phase change liquid ("PCL") saturating and supported by the support matrix within the inner chamber, the PCL and support matrix being distributed throughout the inner chamber so that a payload stowed in the inner chamber must be contained within an overpack so as to avoid direct exposure to the PCL,
the support matrix being configured to maintain support of the PCL as the PCL undergoes a phase change from liquid to vapor during an exposure of the container to a temperature of 1000° F. during a duration of at least 3.5 hours.

2. The container of claim 1, wherein the outer container walls comprise at least one of:
  steel;
  cementitious board;
  fiberglass cloth combined with corrugated cardboard; and
  ceramic fiber cloth combined with corrugated cardboard.

3. The container of claim 1, wherein the outer insulation layer comprises at least one of:
  vermiculite;
  a cellulosic fiber pulp combined with at least one of a boric acid stabilizer and a fire retardant;
  cellulose foam sponge material; and
  a foamed polymeric material.

4. The container of claim 1, wherein the support matrix comprises at least one of:
  vermiculite;
  para aramid fiber pulp;
  meta aramid fiber pulp;
  cellulosic pulp and/or fiber
  cellulose foam sponge in chopped, reticulated, or crumb form;
  polyvinyl alcohol foam sponge material in chopped, reticulated, or crumb form;
  high expansion polyester foam sponge material in chopped, reticulated, or crumb form; and
  open cell polyurethane foam sponge material in chopped, reticulated, or crumb form.

5. The container of claim 1, wherein the container is configured to inhibit evaporation of the PCL when the PCL is at atmospheric pressure, and is further configured to allow vaporized PCL to escape from the container when the PCL is at pressures above atmospheric pressure.

6. The container of claim 1, wherein the PCL has a total weight of less than 4.5 kg.

7. The container of claim 1, wherein the outer insulation layer occupies a volume that is between 30% and 70% of a volume of the outer chamber.

8. A high temperature resistant shipping container comprising an inner chamber containing a support matrix that supports and is saturated by a phase change liquid ("PCL") that includes at least one of water and ethylene glycol, a ratio of a volume of said inner chamber to a volume of said container being between 30% and 70%, the PCL and support matrix being distributed throughout the inner chamber so that a payload stowed in the inner chamber must be contained within an overpack so as to avoid direct exposure to the PCL, the support matrix being configured to maintain support of the PCL as the PCL undergoes a phase change from liquid to vapor during an exposure of the container to a temperature of 1000° F. during a duration of at least 3.5 hours.

9. The container of claim 8, wherein the support matrix includes at least one of:
  expanded vermiculite;
  cellulosic pulp and fiber combined with at least one of boric acid stabilizer and a fire retardant;
  a foamed polymeric material in chopped, reticulated, or crumb form;
  para aramid fiber pulp; and
  meta aramid fiber pulp.

10. The container of claim 8, wherein the support matrix includes at least one of:
  polyvinyl alcohol foam sponge material in chopped, reticulated, or crumb form;
  high expansion polyester foam sponge material in chopped, reticulated, or crumb form;
  open cell polyurethane foam sponge material in chopped, reticulated, or crumb form; and
  cellulose foam sponge material in chopped, reticulated, or crumb form.

11. The container of claim 8, wherein the PCL is water having a total mass that is at least 600% of a mass of the support matrix.

12. The container of claim 8, wherein a super absorbing polymer ("SAP") is blended with the support matrix.

13. The container of claim 12, wherein a mass of the SAP is between 0.5% and 50% of a mass of the support matrix.

14. The container of claim 12, wherein the SAP is able to stabilize a quantity of water having a mass that is more than 100 times as large as a mass of the SAP.

15. A high temperature resistant shipping container comprising an inner chamber containing a phase change liquid ("PCL") saturating and supported by a support matrix and distributed throughout the inner chamber so that a payload stowed in the inner chamber must be contained within an overpack so as to avoid direct exposure to the PCL, the inner chamber having an inner chamber volume that is sufficient to maintain the payload at a temperature below 300° F. during an exposure of the container to a temperature of 1000° F. while the support matrix maintains support of the PCL, said exposure lasting more than 3.5 hours, a ratio of said inner chamber volume to a volume of said container being between 30% and 70%.

16. The container of claim 15, wherein the PCL is water.

17. The container of claim 15, wherein the PCL is supported by a porous matrix.

18. The container of claim 17, wherein the support matrix is expanded vermiculite.

19. The container of claim 15, wherein the PCL is surrounded by a high temperature insulation layer.

20. The container of claim 15, wherein the container comprises an outer steel drum having a containment volume of 10 gallons and an inner steel drum having a containment volume of 5 gallons.

21. The container of claim 15, wherein the container comprises an outer steel drum having a containment volume of 30 gallons and an inner steel drum having a containment volume of 10 gallons.

22. The container of claim 15, wherein the container comprises an outer steel drum having a containment volume of 55 gallons and an inner steel drum having a containment volume of 20 gallons.

23. The container of claim 15, wherein the PCL has a total mass of greater than 2.5 kg.

* * * * *

UNITED STATES PATENT AND TRADEMARK OFFICE
CERTIFICATE OF CORRECTION

PATENT NO. : 9,890,988 B2
APPLICATION NO. : 15/353012
DATED : February 13, 2018
INVENTOR(S) : Charles A. Howland, Jeremy Branson and Isaac Angres It is certified that error appears in the above-identified patent and that said Letters Patent is hereby corrected as shown below:

On the Title Page

Item (73), The assignee should be listed as:
Warwick Mills Inc., New Ipswich, NH and Isaac Angres PhD, Gaithersburg, MD Signed and Sealed this
Twenty-eighth Day of May, 2019

Andrei Iancu
*Director of the United States Patent and Trademark Office*